United States Patent
Berndt et al.

(10) Patent No.: US 7,336,644 B2
(45) Date of Patent: Feb. 26, 2008

(54) METHOD FOR SYNCHRONIZATION OF DATA TRANSMISSION COMPRISING AT LEAST ONE FIRST RADIO SYSTEM AND AT LEAST ONE ADDITIONAL RADIO SYSTEM

(75) Inventors: Holger Berndt, Amberg (DE); Matthias Bienert, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 126 days.

(21) Appl. No.: 10/544,689

(22) PCT Filed: Jan. 21, 2004

(86) PCT No.: PCT/EP2004/000469

§ 371 (c)(1), (2), (4) Date: Aug. 5, 2005

(87) PCT Pub. No.: WO2004/071017

PCT Pub. Date: Aug. 19, 2004

(65) Prior Publication Data

US 2006/0146782 A1 Jul. 6, 2006

(30) Foreign Application Priority Data

Feb. 10, 2003 (DE) ................. 103 05 373

(51) Int. Cl.
*H04L 12/43* (2006.01)
*H04J 3/06* (2006.01)

(52) U.S. Cl. .............. 370/350; 370/459; 370/503

(58) Field of Classification Search .......... 370/459, 370/503, 350, 280, 337, 321, 322, 324, 509, 370/512, 319
See application file for complete search history.

(56) References Cited

U.S. PATENT DOCUMENTS

| | | | |
|---|---|---|---|
| 4,924,462 A * | 5/1990 | Sojka | 370/449 |
| 4,940,974 A * | 7/1990 | Sojka | 340/10.2 |
| 5,329,525 A | 7/1994 | Sakagami | |
| 5,347,562 A * | 9/1994 | Candy | 370/280 |
| 5,448,570 A * | 9/1995 | Toda et al. | 370/337 |
| 5,654,968 A * | 8/1997 | Smiroldo | 370/443 |
| 5,717,376 A | 2/1998 | Wilson | |
| 5,721,735 A * | 2/1998 | Smiroldo | 370/442 |
| 5,898,685 A * | 4/1999 | Schnizlein | 370/350 |
| 6,094,425 A * | 7/2000 | Auger et al. | 370/330 |
| 6,636,738 B1 | 10/2003 | Hayashi | |

(Continued)

FOREIGN PATENT DOCUMENTS

| | | |
|---|---|---|
| EP | 0 424 878 A2 | 5/1991 |
| EP | 1 067 812 A2 | 1/2001 |
| WO | 00/22693 | 4/2000 |
| WO | 01/058197 A1 | 8/2001 |
| WO | 02/066269 A2 | 8/2002 |

*Primary Examiner*—Sonny Trinh
(74) *Attorney, Agent, or Firm*—Laurence A. Greenberg; Werner H. Stemer; Ralph E. Locher

(57) ABSTRACT

The invention relates to a method and an assembly for synchronizing data transmission, comprising at least one first radio system and at least one additional radio system. According to said method, the transmission behavior of the first radio system or systems is evaluated at one point in time x and at least one time interval that follows said point x is calculated in advance between the data blocks. During said interval there is no transmission by the first radio system or systems, or a transmission is expected and the additional radio system or systems can be controlled so that data is transmitted during a time interval of this type.

9 Claims, 1 Drawing Sheet

U.S. PATENT DOCUMENTS 6,751,232 B1 * 6/2004 Patterson et al. ........... 370/459
6,885,639 B2 * 4/2005 Kamiya ...................... 370/235
6,954,439 B2 * 10/2005 Pulkkinen et al. .......... 370/280
2002/0087250 A1 7/2002 Pacsai
2002/0113692 A1 8/2002 Normann et al.

* cited by examiner

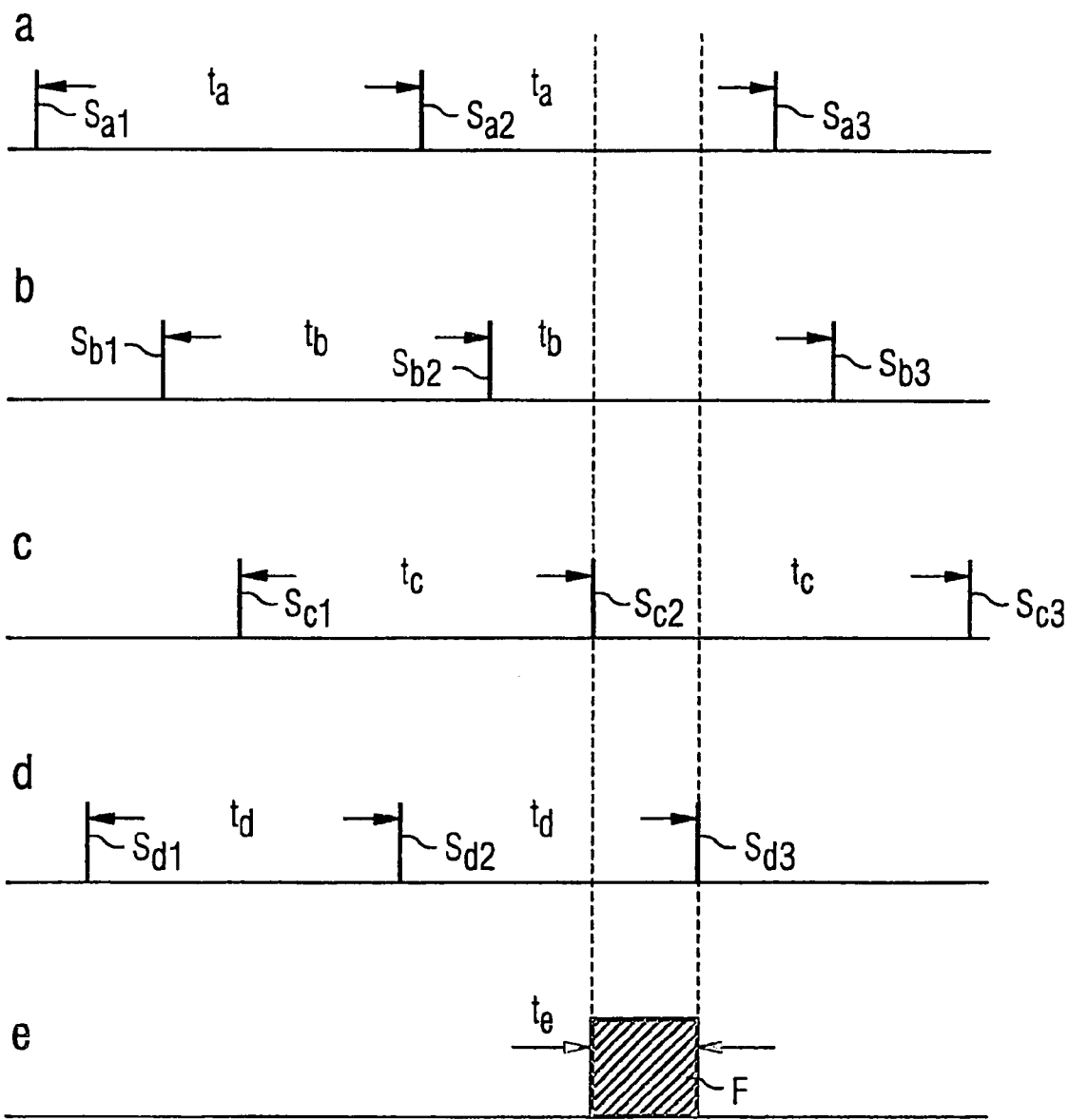

METHOD FOR SYNCHRONIZATION OF DATA TRANSMISSION COMPRISING AT LEAST ONE FIRST RADIO SYSTEM AND AT LEAST ONE ADDITIONAL RADIO SYSTEM

BACKGROUND OF THE INVENTION

Field of the Invention

The invention relates to a method for synchronization of data transmission comprising at least one first radio system and at least one additional radio system, as is employed for example in motor vehicle technology.

Thus items such as radio systems are to be found in a modern motor vehicle, for example to monitor the tire pressure and to check access authorization (authentication, control of the central locking, control of the immobilizer system, engine start etc.).

Some of these radio systems operate with state-dependent transmit rates and pauses so as to allow sufficient functionality while keeping energy consumption as low as possible and to avoid the power supply (battery or accumulator) being discharged too quickly.

With these types of asynchronous radio systems however transmission errors, for example as a result of collisions with signal transmissions of other radio systems, can arise.

It is also necessary with an asynchronous transmission to send or receive for long periods to guarantee a transmission. A longer transmission by a send device especially disadvantageously causes a high consumption of energy which contributes to an undesired rapid discharging of the battery.

SUMMARY OF THE INVENTION

The object of the present invention is thus to create a method for synchronization of the data transmission and an arrangement for this which makes optimized interoperation between a number of radio systems possible, with at least one of the radio systems operating asynchronously.

In accordance with the invention this object is achieved by a method with the features of claim 1 as well as by an arrangement with the features of claim 6.

The evaluation of the transmission behavior of at least a first radio system and advance calculation of at least one subsequent time interval enables an additional radio system to be controlled accordingly. The evaluation and determination of a subsequent time interval for the transmission of the additional radio system can in this case also be undertaken in a simple manner for radio systems with wide tolerances or even for what are known as asynchronous radio systems with state-dependent transmission rates, so the only problem here is that of determining a greater number of consecutive time intervals and the actual occurrence of the further future time intervals becomes ever more unlikely.

Thus for example the send behavior of a radio system or even of a number of send devices of a radio system at a specific point in time x can be simply evaluated in respect of a next (directly) subsequent time interval by a timer being assigned to each send device in each case. If as a time interval an interval is to be determined in which no send activity is undertaken, the timers measure the time between two consecutive send blocks for this purpose.

After the end of a consecutive send block, the counter status determined in this way can be used as an entry by counting down, for example by copying the counter status into a further register, for when the beginning of a next send block is likely to occur or how long the send pause will last.

If a number of send devices are sending, the duration of the time interval can be determined by establishing the point in time from which no further send activity is occurring (beginning of the time interval) by reading the counter with the smallest counter status.

A time interval determined in this way can of course be used as a basis for further subsequent time intervals, in that the further time intervals are determined on the basis of a behavior (for example periodic) that can be computed in advance or in that the time interval determined in the way described here is repeated.

It is also conceivable however that the way of determining a time interval described here can be repeated on demand or permanently for each time interval needed.

This advantageously enables collisions between two or more radio systems operating on one transmission frequency independently of each other. Because of unnecessary transmission repetitions caused by collisions, transmission can be optimized using this method and energy consumption reduced.

In another embodiment the receive behavior of a receiver device operating asynchronously for example can be evaluated and be used for optimized sending of an additional radio system embodied as a send device. To do this, as described previously for example, a time interval is determined in which there is no receive activity. Accordingly the controllable send device can be controlled such that no sending is undertaken in this time interval, to avoid an unnecessary consumption of energy. This advantageously allows transmission by two or more radio system operating together on one transmission frequency (uni- or bidirectional) to be optimized and energy consumption to be reduced.

Naturally it is also conceivable, instead of a time interval with no sending or receiving activity, as described in the two embodiments above, to determine time intervals with send and receive activity and to use them for control of an additional independent radio system or of one interoperating with the first system.

In a preferred embodiment of the invention the at least one first radio system transmits data depending on states at different send rates (asynchronously). The send behavior of the at least first radio system can In this case be evaluated at least within a state with fixed send rates and used for a secure prediction for a time interval. Only with a transition into another state is the interval previously defined at this point with other specifications incorrect.

However collisions of at least two independent radio systems, for example used in the tire pressure monitoring system and access control system are only possible within one state e.g. "vehicle stationary", so that these types of incorrect determinations do not occur. In other cases such a low error rate as a result of normal redundancy (transmission repeated on error) still makes a significant optimization of the transmissions and thereby reduction of the energy consumption with sufficient functionality possible.

In a further embodiment of the invention the abovementioned time intervals are determined by means of an evaluation device in the form of counters assigned in each case to a send device of a first radio system. This counter or these counters can advantageously be integrated into a central control unit to save space. Of course it is also conceivable for the counters to be arranged distributed locally as hardware units or within an integrated evaluation unit in order to advantageously guarantee easier access, for maintenance and repair purposes for example.

In a preferred embodiment of the invention, the inventive synchronization principle is predominantly used to optimize send times since the send activity consumes a particularly large amount of energy. However a reduction in energy consumption can of course also be achieved by optimizing the receive activity.

The invention will be explained in more detail below with reference to an exemplary embodiment shown in the drawing. The drawing shows:

BRIEF DESCRIPTION OF THE DRAWING

FIG. 1 A timing diagram of the send behavior of a number of send devices of a first radio system.

The timing diagram shown in FIG. 1 shows a typical send behavior of a number of send devices of an asynchronous radio system, for example the emissions of wheel sensors or wheel electronics units of a tire pressure checking system of a motor vehicle.

DESCRIPTION OF THE PREFERRED EMBODIMENTS

In this case electronics assigned to each wheel sends the air pressure value recorded by a sensor in the form of a send telegram to a receiver station, usually a central control unit, which for example is responsible for receiving the data from all wheel electronics.

To keep the energy consumption low and not impose an unnecessary load in the automobile battery, there are pauses with a comparatively long duration ta or tb, tc, td (shown in the diagram only as narrow vertical lines) between the short send blocks Sa1-Sa2, Sa2-Sa3 Sb1-Sb2 Sb2-Sb3 Sc1-Sc2 Sc2-Sc3 Sd1-Sd2 Sd2-Sd3 These send telegrams of for example the four wheel electronics units a, b, c, d are sent in the RF range, especially at 433, 868, or 315 MHz. Of course a transmission at other frequencies or even in another range, for example in the microwave range, is however possible.

Although the individual wheel electronics units are usually identical to each other in construction, the time offset of the individual send blocks Sa1 to Sd3 needed for secure reception at the same transmission frequency even without synchronization between the block or predetermined different pause durations (ta< >tb< >tc< >td) is already produced by the available tolerance of for example up to ±20%.

Accordingly an overlap of two or more send blocks and thereby a collision is extremely unlikely.

If for example in the central control unit each send telegram of a wheel electronics unit a, b, c, d is now assigned a counter which is started at a time x after the end of a first send block Sa1, Sb1, Sc1 Sd1 and stopped at the beginning of a new following send block Sa2 Sb2 Sc2 Sd2, the counter status of such a counter stands for the pause time ta, tb, tc, td between two send blocks Sa1-Sa2, Sb1-Sb2, Sc1-Sc2, Sd1-Sd2.

If such a counter status is allowed to be decremented, for example by copying it into a further register, after the end of the next send block Sa2, Sb2, Sc2, Sd2, such a downwards counting counter shows at any time on the timing axis of the timing diagram (horizontal axes) the remaining time before a new send block Sa3, Sb3, Sc3, Sd3 is to be expected.

To determine a time interval F in which no send activity of the wheel electronics units a through d is to be expected, it is only necessary to wait until all counters are counting down or after a point x, in the example "end of the first send block", at all wheel electronics units the event "end of the second send block Sa2, Sb2, Sc2, Sd2" has occurred.

As can be seen from the example, the wheel electronics unit c is the last to send, so that after the end of the second send block Sc2 the wheel electronics unit c the wheel electronics units a, b, d are already in the pause state and their counters are already well advanced in their countdown. At the end of the second send block Sc2 of wheel electronics unit c it can thus be established by reading off the smallest counter status of the other counters when there is likely to be a send block from any given wheel electronics unit a, b, c, d.

In the example shown the counter of the wheel electronics unit d is the furthest advanced or the end of its second send block is furthest back, so that the beginning of a further (third) send block Sd3 of the wheel electronics d defines the end of the time interval F, which thus has a length te which can be predicted even at the start of the time interval.

A time interval which can be foreseen or predicted in this way with a specific length te, in which no send activity of the wheel electronics unit a to d is to be expected, can now for example be used to control an additional radio system or its send devices such that collisions with the applications of the wheel electronics unit a to d can be excluded.

For example the (keyless) access monitoring system in a motor vehicle which operates at the same frequency as the tire pressure checking system can be made to only transmit in such a time interval F or the send device to send so that a send block of this system cannot collide with the send blocks Sa1 to Sd3 of the wheel electronics units a to d.

In addition recording and determining such a time interval produces further opportunities, such as for example optimization of the receive time of a receiving device, for example by switching over the receive device for a time interval F in which no transmissions are to be expected.

On the other hand it is also conceivable, instead or recording the time between send blocks, to record the time between the receive blocks, and in a similar way to that shown above for the send blocks, to determine a time interval in which no receive blocks are to be expected or in which the individual receivers are not ready to receive. Accordingly it is not necessary to send at these times, so that the send device can be switched off accordingly, in which case the transmission can be optimized and the energy consumption reduced.

It is however also conceivable to determine a time interval with the beginning the first receive block of one of for example a number of receive devices, of which the duration extends up to the end of the last receive block of any receive device, so that such a time interval specifies the length of time for which sending is necessary to ensure that all receive devices have received securely.

As an example of synchronization with a ready-to-receive time or with receive blocks a wheel electronics unit might be considered which not only sends, but at another frequency, for example in the Kilohertz range, especially at 120 kHz, can receive a trigger signal of a trigger sender.

The energy-hungry transmission of such a trigger sender can be optimized in accordance with the invention by evaluation of the receive time of the receive blocks to the relevant pause durations, so that the send times of the trigger sender are reduced and the energy consumption and thereby the load on the power source, especially the automobile battery, can be reduced.

Naturally the methods in accordance with the invention and the inventive arrangement are not restricted to the exemplary embodiment shown, but can be used in many areas of application.

Thus it is conceivable, using the method in accordance with the invention, to synchronize radio systems which in general may possibly collide, in order to avoid collisions and save energy without calling on another transmission frequency.

It is self-evident to a person skilled in the art that the advance calculation of a time interval (covering all embodiments) can be undertaken at any time as required or at a predetermined time. Further time intervals can be calculated in advance on the basis of an easy-to-calculate relationship (e.g. periodic) at least within a (with conditions remaining the same) state of the first time interval determined.

It is however also conceivable, for further time intervals, to establish a new interval in each case (as detailed above) with such new intervals being able to be defined or determined on demand, on a one-off basis or permanently at specific intervals or immediately after one another (counting any interval between send blocks and counting down—even with simultaneous counting).

Thus a repetition of the determining of a time interval can follow on immediately from the example shown, in that for example after each end of send block Sa1 to Sd3 a counter measures the interval to (start of) the next send block, the counter status is copied into another register which counts down after the end of this send block. During the countdown the counters can already be counting up with another register with the end of this send block (possible after a reset), in order to determine the next interval which can again be copied as the counter state into the register for counting down.

We claim:

1. A method of synchronizing data transmissions with at least one first radio system and at least one additional radio system, which comprises:
   evaluating a transmission behavior of the at least one first radio system at a point in time x;
   calculating in advance at least one future time window between data blocks following the point in time x during which no transmission of the at least one first radio system will be undertaken or transmission is expected;
   controlling the at least one additional radio system to transmit data within the at least one time window; and
   operating the at least one first radio system to transmit and receive asynchronously with a plurality of transmission devices on a common transmission frequency, so that time intervals arise wherein no transmission occurs or is expected.

2. The method according to claim 1, wherein the at least one first radio system and the at least one additional radio system operate independently of one another with a common transmission frequency.

3. In a motor vehicle, the method according to claim 1 wherein the at least one first radio system forms a part of a tire pressure monitoring device and the at least one additional radio system forms a part of an access control system of the motor vehicle.

4. A method of synchronizing data transmissions with at least one first radio system and at least one additional radio system, which comprises:
   transmitting data with the at least one first radio system dependent on a state thereof at different transmission rates;
   evaluating the transmission behavior of the at least one first radio system at a point in time x and within one state thereof with fixed transmission rates;
   calculating in advance at least one time window between data blocks following the point in time x during which no transmission of the at least one first radio system is undertaken or transmission is expected; and
   controlling the at least one additional radio system to transmit data within the at least one time window.

5. A method of synchronizing data transmissions with at least one first radio system and at least one additional radio system, which comprises:
   evaluating a transmission behavior of the at least one first radio system at a point in time x;
   calculating in advance at least one time window between data blocks following the point in time x during which no transmission of the at least one first radio system is undertaken or transmission is expected;
   controlling the at least one additional radio system to transmit data within the at least one time window; and
   recording a length of time between two transmission blocks with a counter assigned to each respective transmission device, and counting down a counter state of the counter at an end of the transmission block.

6. A radio configuration, comprising:
   at least one first radio system with a plurality of transmission devices operating asynchronously;
   at least one additional radio system;
   an evaluation unit configured to calculate in advance a future time window during which said at least one first radio system does not transmit or expect a transmission, said evaluation unit including a counter for each of said transmission devices of said at least one first radio system, and each counter being configured to count downward; and
   said at least one additional radio system having an activatable transmission device configured to transmit during the future time window calculated by said evaluation unit.

7. The configuration according to claim 6, wherein said evaluation unit is integrated in a central control unit.

8. In a motor vehicle, the configuration according to claim 6, wherein said at least one first radio system forms a part of a tire pressure monitoring device and said at least one additional radio system forms a part of an access control system of the motor vehicle.

9. A radio configuration, comprising:
   at least one first radio system;
   at least one additional radio system with a plurality of transmission devices operating asynchronously;
   an evaluation unit configured to calculate in advance a future time window during which said at least one first radio system does not transmit or expect a transmission; and
   said at least one additional radio system having an activatable transmission device configured to transmit during the future time window calculated by said evaluation unit;
   said evaluation unit including a counter for each of said transmission devices of said at least one first radio system, each counter being configured to count downward.

* * * * *